Sept. 28, 1943.    P. ALEXANDER    2,330,774
MIXING DEVICE
Filed Oct. 11, 1940
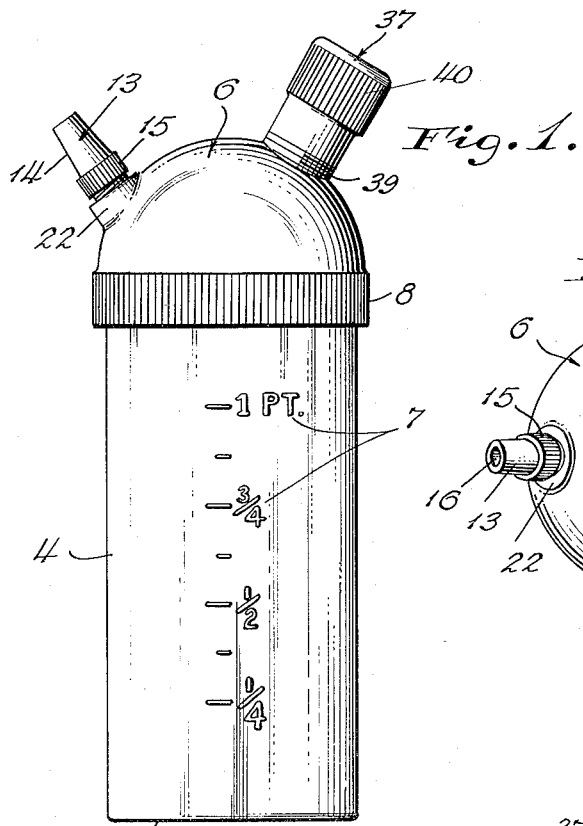
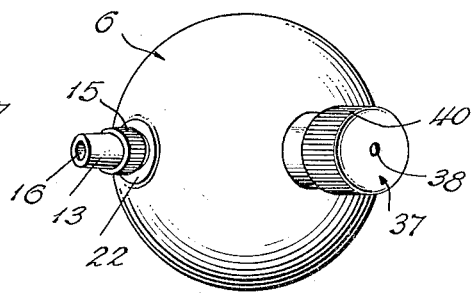
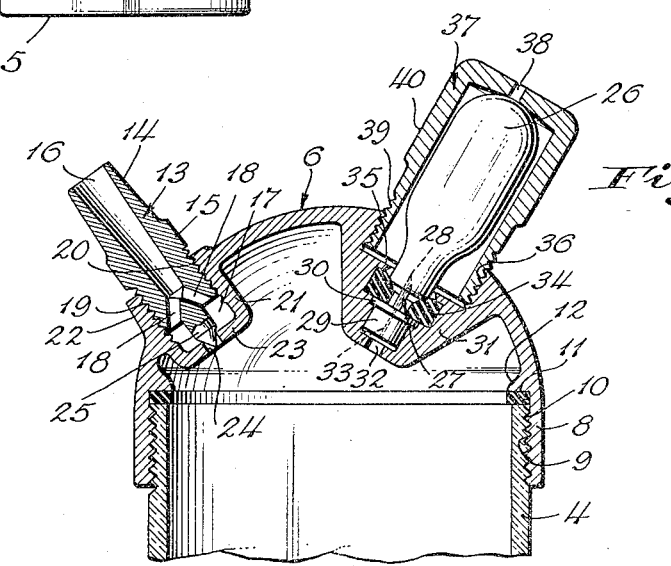
INVENTOR.
PHILIP ALEXANDER
BY
Richards & Geier
ATTORNEYS Patented Sept. 28, 1943

2,330,774

UNITED STATES PATENT OFFICE 2,330,774

MIXING DEVICE

Philip Alexander, Brooklyn, N. Y.

Application October 11, 1940, Serial No. 360,709

1 Claim. (Cl. 221—74)

This invention relates to a container and refers more particularly to a mixing device used for introducing a gas into a liquid, or a semi-solid mass.

The container manufactured in accordance with the principles of the present invention may be conveniently utilized for the purpose of introducing carbon gas into a liquid to charge the latter. Furthermore, such a container is particularly suitable for making ice-cream at home by a method which is described in detail in my co-pending application for United States Letters Patent, Serial No. 354,695 filed August 29, 1940, relating to ice-cream, said method including the step of aerating an ice-cream mix by carbon dioxide.

An object of the present invention is the provision of an aerating device which is simple and sturdy in construction, inexpensive to manufacture and convenient in operation, and by means of which a gas contained under pressure in cartridges may be easily, quickly and thoroughly mixed with a liquid or a semi-solid mass.

Other objects of the present invention will become apparent in the course of the following specification.

In accomplishing the objects of the present invention, it was found advisable to provide a container having a cover which carries a valve controlled spout or nozzle for dispensing the contents of the container, as well as means receiving and holding the capsule or cartridge containing gas under pressure; these means include a device puncturing the capsule and transmitting the gas from the punctured capsule into the interior of the container.

The invention will appear more clearly from the following detailed description when taken in connection with the accompanying drawing showing, by way of example, a preferred embodiment of the inventive idea.

In the drawing:

Figure 1 shows in side elevation a device constructed in accordance with the principles of the present invention.

Figure 2 is a section through the top portion of the device shown in Figure 1, on an enlarged scale.

Figure 3 is a top view of the device.

The mixer shown in the drawing comprises a container having a cylindrical body 4, a bottom 5, and a cover 6. The container 4 may be provided with any suitable indicia 7 indicating the amounts of a liquid or of a semi-solid mass, such as an ice-cream mix, within the container.

The cover 6 is preferably substantially semi-spherical in form and is provided with a ribbed skirt 8 carrying screw threads 9 which are adapted to mesh with the screw threads 10 provided at the top of the cylindrical body 4.

A rubber ring 11 is carried by the top edge of the body 4 and is adapted to be engaged by a flange 12 provided upon the inner surface of the cover 6. Thus, a gas-tight and a liquid-tight seal is provided between the cover 6 and the body 4.

The spout or nozzle 13 used for dispensing the contents of the body 4 is preferably located upon one side of the spherical cover 6 and extends at a comparatively small angle in relation to the central axis of the body 4. This makes it possible to mix thoroughly the ice-cream mix situated within the body 4 with the gas and to remove substantially all of the mix after it has been aerated without unscrewing the cover 6.

The nozzle 13 has an outwardly converging surface 14 and an annular ribbed portion 15. The interior of the nozzle 13 has the form of an outwardly diverging passage 16 communicating with a chamber 17 by means of a plurality of passages 18.

The nozzle 13 is provided with screw threads 19 which mesh with screw threads 20 formed in the inner side walls of a cylindrical body 21. The body 21 is integral with the cover 6 and terminates outwardly in the form of a round flange 22.

The bottom 23 of the body 21 is provided with a passage 24 and constitutes a valve seat for a valve body 25 which is integral with the nozzle 13. The passage 24 connects the chamber 17 with the interior of the container. The valve body 25 is located centrally in relation to the nozzle 13 and to the passages 18 formed in the nozzle.

The device used for perforating a gas-containing cartridge or capsule 26 includes a cutter 27 having a sharp end 28 and carried by a holder 29. The holder 29 is provided with a flange 30 and fits in a correspondingly shaped recess provided in a support 31 which is integral with the cover 6.

The support 31 has a passage 32 which communicates with a passage 33 formed in the holder 29 and the cutter 27 and extending up to the sharp end 28 of the cutter.

A washer 34 is also situated within the support 31 between the holder 29 and a flange 35 which may be integral with the support 31.

An outer cylindrical recess formed in the support 31 is provided with screw threads 36.

The cartridge 26 may be placed within an elongated cylindrical cover 37 provided with a passage 38 communicating with the interior of the cover. The cover has screw threads 39 adapted to mesh with the screw threads 36. An annular ribbed portion 40 facilitates the turning of the cover 37.

In operation, the user unscrews the cover 37 to insert a gas-containing capsule or cartridge 26 therein. Then the cover 37 containing the cartridge 26 is screwed into its support 31. It is important that at that time, the nozzle 13 should be screwed inwardly to the fullest extent so that the passage 24 is closed by the valve-body 25.

While the cover 37 with the cartridge 26 is being screwed into the support 31, the cutter 27 will engage the cartridge 26 and the sharp end 28 of the cutter will finally pierce the cartridge. Then gas contained in the cartridge 26 will escape through the passage 33 formed in the cutter 28 and the holder 29, and through the passage 32 formed in the support 31, into the interior of the container 4. The gas will be thoroughly mixed with the ice-cream mix or any other substance situated in the body 4.

Then the user gradually unscrews the nozzle 13 to remove the aerated mix which flows out of the container through the passage 24, the chamber 17, the passages 18 and the passage 16.

It is apparent that the specific illustration shown above has been given by way of illustration and not by way of limitation and that the structure above described is subject to wide variations and modifications without departing from the scope or intent of the present invention. All of such variations and modifications are to be included in the scope of the present invention.

What is claimed is:

A cover for an aerating device, said cover having the form of a thin semi-spherical body and including an inwardly projecting hollow member forming an integral well in said cover having screw threads and a passage formed therein, said passage connecting the interior of said hollow member with the interior of said aerating device, a spout having screw threads meshing with the screw threads of said member, said spout having a central conical passage formed therein, a valve body connected with said spout and adapted to close and open the passage formed in said hollow member, and at least one other passage formed in said spout and connecting the central passage formed in the spout with the interior of the aerating device.

PHILIP ALEXANDER.